(12) United States Patent
Weng (10) Patent No.: US 11,500,741 B2
(45) Date of Patent: Nov. 15, 2022

(54) DATA WRITE METHOD AND STORAGE SYSTEM

(71) Applicant: Huawei Technologies Co., Ltd., Shenzhen (CN)

(72) Inventor: Wendi Weng, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/141,953

(22) Filed: Jan. 5, 2021

(65) Prior Publication Data

US 2021/0124653 A1 Apr. 29, 2021

Related U.S. Application Data

(63) Continuation of application No. PCT/CN2019/076846, filed on Mar. 4, 2019.

(30) Foreign Application Priority Data

Jul. 5, 2018 (CN) .......................... 201810735737.6

(51) Int. Cl.
*G06F 11/14* (2006.01)
*G06F 3/06* (2006.01)

(52) U.S. Cl.
CPC ........ *G06F 11/1469* (2013.01); *G06F 3/0619* (2013.01); *G06F 3/0653* (2013.01); *G06F 3/0659* (2013.01); *G06F 11/1451* (2013.01); *G06F 2201/84* (2013.01)

(58) Field of Classification Search
CPC ............. G06F 11/1469; G06F 11/1451; G06F 2201/84
See application file for complete search history.

(56) References Cited

U.S. PATENT DOCUMENTS

2009/0210458 A1 8/2009 Glover et al.
2010/0274971 A1* 10/2010 Solihin ............... G06F 12/0831
711/146
2014/0101107 A1 4/2014 Takayama et al.
2014/0351534 A1* 11/2014 Crawford ............... G06F 3/065
711/162
(Continued)

FOREIGN PATENT DOCUMENTS

CN 101526925 A 9/2009
CN 103488431 A 1/2014
(Continued)

*Primary Examiner* — Nicholas J Simonetti
(74) *Attorney, Agent, or Firm* — Leydig, Voit & Mayer, Ltd.

(57) ABSTRACT

A data write method and a corresponding storage system are provided. The storage system includes a first controller and a second controller, and the method includes: after receiving a first data write request, determining, by the second controller, whether a locally stored first time tag is in an expired state; when determining that the locally stored first time tag is in the expired state, reading, by the second controller, the first time tag from the first controller; and storing, by the second controller, a correspondence between the first time tag and the first data write request. According to the present invention, time consistency is ensured when a snapshot operation is performed on a logical storage area, and performance fluctuation is reduced.

12 Claims, 3 Drawing Sheets

(56) References Cited

U.S. PATENT DOCUMENTS

2018/0032272 A1\* 2/2018 Sato .................. G06F 3/0688
2019/0278638 A1\* 9/2019 Kim ................... G06F 9/544

FOREIGN PATENT DOCUMENTS

| | | |
|---|---|---|
| CN | 103842954 A | 6/2014 |
| CN | 105450687 A | 3/2016 |
| CN | 106802770 A | 6/2017 |
| JP | 2006113667 A | 4/2006 |
| WO | 2015035814 A1 | 3/2015 |
| WO | 2015081521 A1 | 6/2015 |

\* cited by examiner

DATA WRITE METHOD AND STORAGE SYSTEM

CROSS-REFERENCE TO RELATED APPLICATIONS

This application is a continuation of International Application No. PCT/CN2019/076846, filed on Mar. 4, 2019, which claims priority to Chinese Patent Application No. 201810735737.6 filed on Jul. 5, 2018. The disclosures of the aforementioned applications are hereby incorporated by reference in their entireties.

TECHNICAL FIELD

Embodiments of the present invention relate to the field of data storage, and in particular, to a data write method and a storage system.

BACKGROUND

With great development of computer technologies, data backup is also gradually becoming even more important. Traditionally, people use technologies such as data replication, data backup, and data restoration to protect important data information and periodically back up or replicate data. Because data backup affects application performance and is time-consuming, the data backup is usually performed when a system has lighter load (for example, at night).

During data backup, an enterprise needs to temporarily stop providing services to outside. As data of an enterprise grows rapidly in terms of amount and speed, a backup window may be increasingly longer, and this is unacceptable for a critical service system. For example, information systems of banks and telecommunications organizations are required to provide a 24×7 uninterrupted service. A short downtime or a few data losses will cause huge losses. Therefore, the data backup window needs to be minimized or even reduced to zero. A data snapshot is a data protection technology developed to meet such requirements. A snapshot is an image of a data set at a specific moment, and is also referred to as an instant copy. The snapshot is a complete available copy of the data set.

To ensure data consistency, I/Os of all nodes need to be blocked when a snapshot operation is performed on a data set. After a time tag is changed, the I/Os are unblocked. However, the entire process needs to complete operations such as performing time point persistence and a plurality of message broadcasts, and a delay may reach hundreds of milliseconds, causing performance fluctuation. In scenarios such as asynchronous replication and a snapshot of a second-level recovery point objective (recovery point object, RPO), a second-level snapshot is created. Therefore, there is no doubt that the solution in which I/Os are blocked to ensure data consistency of a snapshot causes great performance fluctuation.

SUMMARY

This application provides a data write method and a storage system, to ensure time consistency when a snapshot operation is performed on a logical storage area, and reduce performance fluctuation.

According to a first aspect, this application provides a data write method, where method is applied to a storage system, the storage system includes a first controller and a second controller, and the method includes:

after receiving a first data write request, determining, by the second controller, whether a locally stored first time tag is in an expired state; when determining that the locally stored first time tag is in the expired state, reading, by the second controller, the first time tag from the first controller; and storing, by the second controller, a correspondence between the first time tag and the first data write request. The method is used to ensure time consistency when a snapshot operation is performed on a logical storage area, and reduce performance fluctuation.

In a feasible implementation, the storage system further includes a logical storage area, and both the first controller and the second controller can read data from and write data to the logical storage area.

In a feasible implementation, the method further includes:

when performing a snapshot operation on the logical storage area, sending, by the first controller, a first indication message to the second controller, where the first indication message is used to indicate that the locally stored first time tag is expired; and after receiving the first indication message, setting, by the second controller, the first time tag locally stored in the second controller to the expired state.

In a feasible implementation, the method further includes:

sending, by the first controller, a second indication message to the second controller, where the second indication message is used to indicate that the first controller has modified the first time tag to a second time tag;

after receiving the second indication message, locally storing, by the second controller, the second time tag; and after receiving a second data write request, locally reading, by the second controller, the second time tag from the second controller, and storing a correspondence between the second time tag and the second data write request.

In a feasible implementation, before the second controller receives the second indication message, and after the second controller receives the first indication message, all time tags corresponding to all received data write requests are from the first controller.

According to a second aspect, this application further provides a storage system. The storage system includes a first controller and a second controller, where after receiving a first data write request, the second controller is configured to determine whether a locally stored first time tag is in an expired state; and when determining that the locally stored first time tag is in the expired state, the second controller is further configured to: read the first time tag from the first controller, and store a correspondence between the first time tag and the first data write request.

In a feasible implementation, the storage system further includes a logical storage area, and both the first controller and the second controller can read data from and write data to the logical storage area.

In a feasible implementation, when performing a snapshot operation on the logical storage area, the first controller is configured to send a first indication message to the second controller, where the first indication message is used to indicate that the locally stored first time tag is expired; and after receiving the first indication message, the second controller is further configured to set the first time tag locally stored in the second controller to the expired state.

In a feasible implementation, the first controller is further configured to send a second indication message to the second controller, where the second indication message is used to indicate that the first controller has modified the first time tag to a second time tag;

after receiving the second indication message, the second controller is further configured to locally store the second time tag; and after receiving a second data write request, the second controller is further configured to: locally read the second time tag from the second controller, and store a correspondence between the second time tag and the second data write request.

In a feasible implementation, before the second controller receives the second indication message, and after the second controller receives the first indication message, all time tags corresponding to all received data write requests are from the first controller.

These aspects or other aspects of the present invention are clearer and more comprehensible in descriptions of the following embodiments.

BRIEF DESCRIPTION OF DRAWINGS

To describe the technical solutions in the embodiments of the present invention more clearly, the following briefly describes the accompanying drawings required for describing the embodiments or a prior art.

DESCRIPTION OF EMBODIMENTS

The following describes the embodiments of this application with reference to accompanying drawings.

Figure 1:
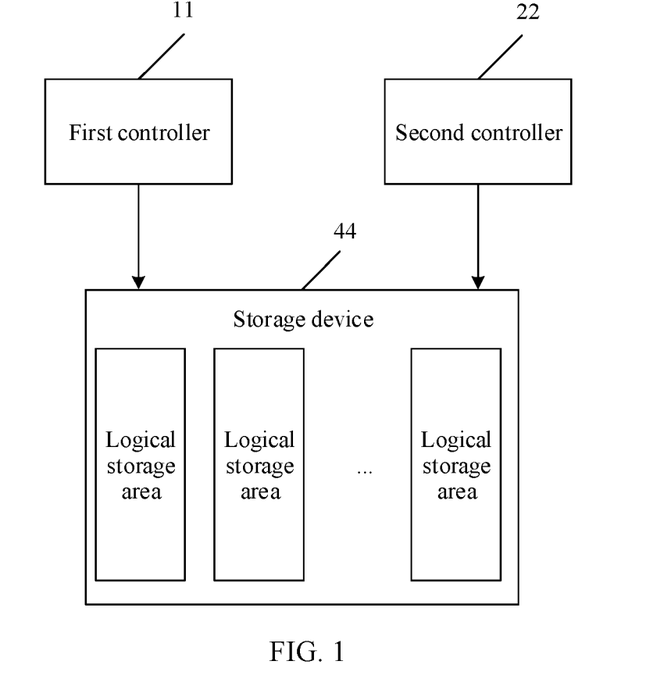
FIG. 1 is a schematic structural diagram of a storage system according to an embodiment of the present invention.

Referring to FIG. 1, FIG. 1 is a schematic structural diagram of a storage system according to an embodiment of the present invention. As shown in FIG. 1, the storage system includes at least two controllers (a first controller 11 and a second controller 22 shown in FIG. 1) and a plurality of logical storage areas 44.

The controller 11 and the controller 22 are separately connected to a host (not shown in the figure) by using a storage area network (SAN). The controller 11 may communicate with the controller 22, and the controller 11 has a same physical structure and function as the controller 22. The controller 11 is used as an example, and the controller 11 may be a computing device, such as a server or a desktop computer. An operating system and an application are installed on the controller 11. The controller 11 may receive an input/output (I/O) request from the host. The controller 11 may further store data (if there is data) carried in the I/O request, and write the data into the storage device 44.

The storage device 44 includes but is not limited to storage devices such as a solid state disk (SSD), a removable hard disk, or a hard disk drive.

The SSD is a memory that uses a flash memory chip as a storage medium, and is also referred to as a solid-state drive (SSD).

FIG. 1 is described merely for an illustration purpose. In practical application, a storage system may include a plurality of controllers. A physical structure and a function of each controller are similar to those of the controller 11. In addition, a connection manner between the controller 11 and the controller 22 and a connection manner between any controller and the storage device 44 are not limited in this embodiment, provided that the controllers can communicate with each other and that each of the controllers and the storage device 44 can communicate with each other.

Figure 2:
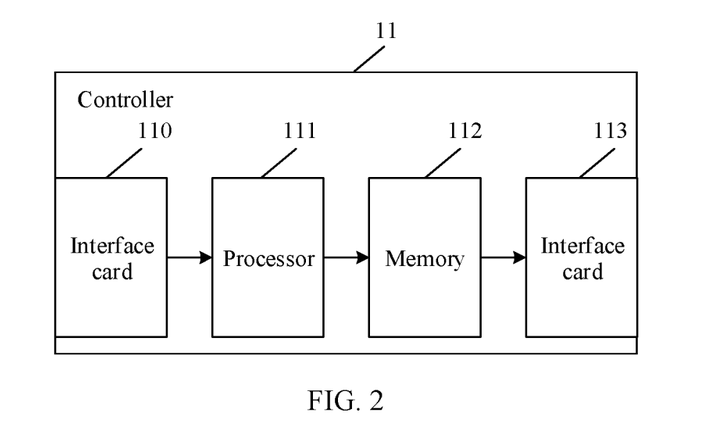
FIG. 2 is a schematic structural diagram of a controller according to an embodiment of the present invention.

FIG. 2 is an example structural diagram of the controller 11. As shown in FIG. 2, the controller 11 includes an interface card 110, a processor 111, and an interface card 113.

The interface card 110 is configured to communicate with the host, and the controller 11 may receive an operation instruction of the host by using the interface card 110. The processor 112 may be a central processing unit (CPU). In this embodiment of the present invention, the processor 112 may be configured to receive an I/O request from the host and process the I/O request. The I/O request may be a data write request or a data read request. The processor 112 may further send data in the data write request to the logical storage area 44.

Optionally, the controller 11 may further include a memory 112. The memory 111 is configured to temporarily store data received from the host or data read from the storage device 44. When receiving a plurality of data write requests sent by the host, the controller 11 may temporarily store data in the plurality of data write requests in the memory 111. When a capacity of the memory 111 reaches a specific threshold, the data stored in the memory 111 and a logical address allocated to the data are sent to the storage device 44. The storage device 44 stores the data. The memory 111 includes a volatile memory, a nonvolatile memory, or a combination thereof. The volatile memory is, for example, a random access memory (RAM). The nonvolatile memory is, for example, various machine-readable media that can store program code, such as a floppy disk, a hard disk, a solid state disk (SSD), or an optical disc. The memory 111 has a power-failure protection function. The power-failure protection function means that the data stored in the memory 111 is not lost even when a system is powered on again after a power failure.

The interface card 113 is configured to communicate with the storage device 44. The controller 11 may send, by using the interface card 113, a data write request (including data and a logical address that is allocated by the controller 11 to the data) to the storage device 44 for storage.

It should be noted herein that a structure and functions of all components of the controller 22 are similar to those of the controller 11, and details are not described herein again.

A block, a page, and an actual address that are in a storage device are invisible to a controller. Therefore, the controller cannot directly access the block and the page that are in the logical storage area. To write data, the system controller divides, according to a specified size, storage space of the storage device into several logical unit numbers (logic unit number, LUN). The LUN may also be referred to as a logical storage area. Data is written based on a logical storage area. Each logical storage area is a set of a plurality of consecutive logical addresses. For example, the specified size is 1024 KB. A logical address range corresponding to one logical storage area N is from 0 KB to 1023 KB; a logical address range corresponding to another logical storage area is from 1024 KB to 2047 KB; and a logical address range corresponding to still another logical storage area is from 2048 KB to 3071 KB, and the like.

When data is written to a logical storage area, the data may be written in sectors. For example, one sector includes 520 bytes. Data occupies 512 bytes, and a data integrity field (DIF) of the 512-byte data occupies 8 bytes. In other words, data written each time needs to be an integral multiple of 512 bytes. If a size of the data does not reach an integral multiple of 512 bytes, zeros may be filled in the data. Similarly, when data is read from a logical storage area, the data is also read in sectors.

Figure 3:
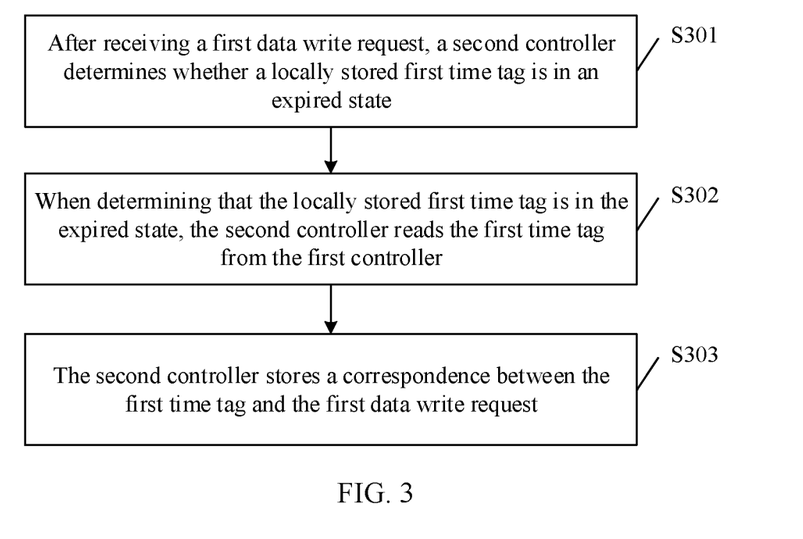
FIG. 3 is a schematic flowchart of a data write method according to an embodiment of the present invention.

Referring to FIG. 3, FIG. 3 is a schematic flowchart of a data write method according to an embodiment of the present invention. The data write method is applied to a storage system, and the storage system includes a first controller and a second controller. As shown in FIG. 3, the method includes the following steps.

S301: After receiving a first data write request, the second controller determines whether a locally stored first time tag is in an expired state.

The storage system further includes a logical storage area, and both the first controller and the second controller can read data from and write data to the logical storage area.

The first data write request carries first data, and the first data write request is used to request the second controller to write the first data to the logical storage area.

Specifically, the first time tag is locally stored in the second controller. After the second controller receives the first data write request, the second controller determines whether the first time tag locally stored in the second controller is in the expired state. When determining the first time tag locally stored in the second controller is not in the expired state, the second controller stores a correspondence between the first time tag and the first data write request; adds the first data carried in the first data write request with the first time tag; and writes the first data added with the first time tag to the logical storage area.

S302: When determining that the locally stored first time tag is in the expired state, the second controller reads the first time tag from the first controller.

In a feasible embodiment, the method further includes:

when performing a snapshot operation on the logical storage area, sending, by the first controller, a first indication message to the second controller, where the first indication message is used to indicate that the locally stored first time tag is expired; and after receiving the first indication message, setting, by the second controller, the first time tag locally stored in the second controller to the expired state.

Specifically, when the first controller performs the snapshot operation on the logical storage area, the first controller stores the first time tag in a memory M, and broadcasts the first indication message. The first indication message carries a start address of the memory M, and the first indication message is used to indicate that the locally stored first time tag is expired. The memory M is a part of storage space of a memory of the first controller. After receiving the first indication message, the second controller sets the first time tag locally stored in the second controller to the expired state.

After the second controller receives the first data write request, and when the second controller determines the first time tag locally stored in the second controller is in the expired state, the second controller reads, based on the address carried in the first indication message, the first time tag from the memory M.

It should be noted herein that the first controller performs the snapshot operation on the logical storage area means that data stored in the logical storage area is backed up before a current moment.

S303: The second controller stores a correspondence between the first time tag and the first data write request.

Specifically, the second controller stores the correspondence between the first time tag and the first data write request, adds the first time tag to the first data carried in the first data write request, and writes the first data added with the first time tag to the logical storage area.

In a feasible embodiment, the method further includes:

sending, by the first controller, a second indication message to the second controller, where the second indication message is used to indicate that the first controller has modified the first time tag to a second time tag;

after receiving the second indication message, locally storing, by the second controller, the second time tag; and after receiving a second data write request, locally reading, by the second controller, the second time tag from the second controller, and storing a correspondence between the second time tag and the second data write request.

Specifically, after the first controller broadcasts the first indication message, that is, sends the first indication message to the second controller, the first controller modifies the first time tag stored in the memory M to the second time tag. Then, the first controller broadcasts the second indication message, that is, sends the second indication message to the second controller. The second indication message is used to indicate that the first controller has modified the first time tag to the second time tag, and the second indication message carries the second time tag.

After receiving the second indication message, the second controller locally stores the second time tag carried in the second indication message to the second controller.

After the second controller receives the second data write request, the second controller locally reads the second time tag from the second controller, and stores the correspondence between the second time tag and the second data write request. The second controller adds the second time tag to second data carried in the second data write request, and writes the second data added with the second time tag to the logical storage area.

In a feasible embodiment, before the second controller receives the second indication message, and after the second controller receives the first indication message, all time tags corresponding to all received data write requests are from the first controller.

Specifically, before the second controller receives the second indication message, and after the second controller receives the first indication message, after receiving a data write request, the second controller obtains, based on the address in the first indication message, the first time tag from the memory M of the first controller, and stores a correspondence between the first time tag and the data write request.

It can be learned that in the solution in this embodiment of the present invention, after receiving the first data write request, the second controller determines whether the locally stored first time tag is in the expired state. When determining that the locally stored first time tag is in the expired state, the second controller reads the first time tag from the first controller, and stores the correspondence between the first time tag and the first data write request. This ensures time consistency when a snapshot operation is performed on a logical storage area, and reduces performance fluctuation.

Figure 4:
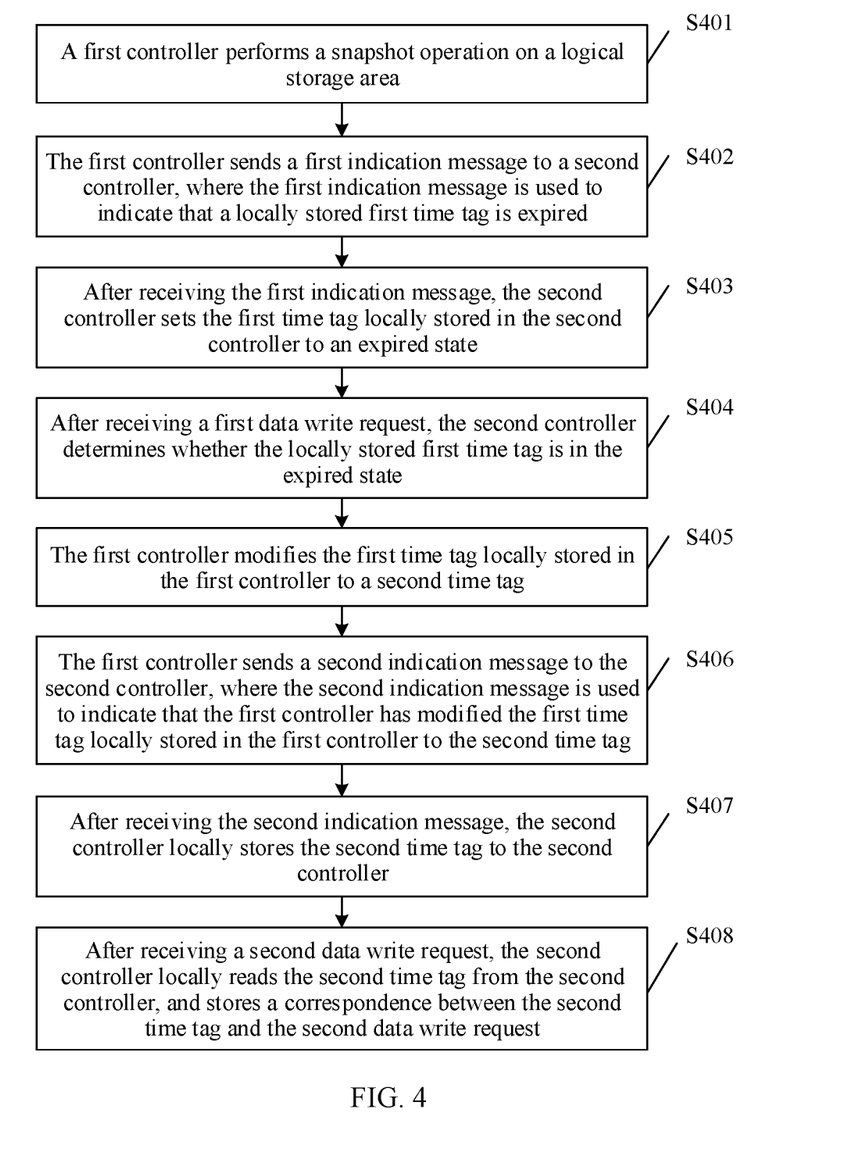
FIG. 4 is a schematic flowchart of another data write method according to an embodiment of the present invention.

Referring to FIG. 4, FIG. 4 is a schematic interactive flowchart of another data write method according to an embodiment of the present invention. The method is applied to a storage system, and the storage system includes a first controller, a second controller, and a logical storage area. As shown in FIG. 4, the method includes the following steps.

S401: The first controller performs a snapshot operation on the logical storage area.

That the first controller performs a snapshot operation on the logical storage area specifically means that the first controller backs up data stored in the logical storage area before a current moment.

Further, after the first controller performs the snapshot operation on the logical storage area, the first controller sets a first time tag locally stored in the first controller to an expired state. The first controller applies for a memory M from a memory of the first controller, and stores the first time tag in the memory M.

Further, before the first controller modifies the first time tag locally stored in the first controller to a second time tag, and after the first controller receives a data write request, the first controller obtains the first time tag from the memory M, and stores a correspondence between the first time tag and the data write request.

S402: The first controller sends a first indication message to the second controller, where the first indication message is used to indicate that the locally stored first time tag is expired.

Specifically, the first controller broadcasts the first indication message, so that the second controller can receive the first indication message. The first indication message carries a start address of the memory M.

S403: After receiving the first indication message, the second controller sets the first time tag locally stored in the second controller to the expired state.

S404: After receiving a first data write request, the second controller determines whether the locally stored first time tag is in the expired state.

The first data write request carries first data.

Specifically, when determining that the first time tag locally stored in the second controller is not in the expired state, the second controller locally obtains the first time tag from the second controller, and stores a correspondence between the first time tag and the first data write request.

When determining that the first time tag locally stored in the second controller is in the expired state, the second controller obtains, based on the start address of the memory M, the first time tag from the memory M of the first controller, and stores the correspondence between the first time tag and the first data write request.

The second controller adds the first time tag to the first data carried in the first data write request, and writes the first data added with the first time tag to the logical storage area.

S405: The first controller modifies the first time tag locally stored in the first controller to the second time tag.

It should be noted that, after the first controller modifies the locally stored first time tag to the second time tag, when receiving a data write request, the first controller locally reads the second time tag from the first controller, and stores a correspondence between the second time tag and the data write request.

The first controller adds the second time tag to data carried in the data write request, and stores the data added with the second time tag to the logical storage area.

S406: The first controller sends a second indication message to the second controller, where the second indication message is used to indicate that the first controller has modified the first time tag locally stored in the first controller to the second time tag.

S407: After receiving the second indication message, the second controller locally stores the second time tag to the second controller.

The second indication message carries the second time tag. After receiving the second indication message, the second controller locally stores the second time tag to the second controller.

It should be noted that, after the second controller receives the first indication message, and before the second controller receives the second indication message, the second controller receives the data write request, obtains, based on the start address that is of the memory M and that is carried in the first indication message, the first time tag from the first controller, and stores a correspondence between the first time tag and the data write request.

S408: After receiving the second data write request, the second controller locally reads the second time tag from the second controller, and stores a correspondence between the second time tag and the second data write request.

Specifically, the second data write request carries second data. After receiving the second data write request, the second controller locally reads the second time tag from the second controller, adds the second time tag to the second data, and writes the second data added with the second time tag to the logical storage area.

It should be noted that, to make the description brief, the method embodiments are expressed as a series of actions. However, a person skilled in the art should appreciate that the present invention is not limited to the described action sequence, because according to the present invention, some steps may be performed in other sequences or performed simultaneously. In addition, a person skilled in the art should also appreciate that all the embodiments described in the specification are used as examples, and the related actions and modules are not necessarily mandatory to the present invention.

In the embodiments, the descriptions of each embodiment have respective focuses. For a part that is not described in detail in an embodiment, refer to related descriptions in other embodiments.

In the several embodiments provided in this application, it should be understood that the disclosed apparatus may be implemented in other manners. For example, the described apparatus embodiment is used as an example. For example, the unit division is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable memory. Based on such an understanding, the technical solutions of the present invention essentially, or the part contributing to a prior art, or all or some of the technical solutions may be implemented in the form of a software product. The computer software product is stored in a memory and includes several instructions for instructing a computer device (which may be a personal computer, a server, or a network device) to perform all or some of the steps of the methods described in the embodiments of the present invention. The memory includes: any medium that can store program code, such as a USB flash drive, a read-only memory (ROM), a random access memory (RAM), or a removable hard disk.

A person of ordinary skill in the art may understand that all or some of the steps of the methods in the embodiments may be implemented by a program instructing relevant hardware. The program may be stored in a computer-readable memory. The memory may include a flash drive, a read-only memory (ROM for short), a random access memory (RAM for short), a magnetic disk, an optical disc, or the like.

The embodiments of the present invention are described in detail above. The principle and implementation of the present invention are described herein through specific examples. The description about the embodiments of the present invention is merely provided to help understand the method and core ideas of the present invention. In addition, a person of ordinary skill in the art can make variations and modifications to the present invention in terms of the specific implementations and application scopes according to the ideas of the present invention. Therefore, the content of specification shall not be construed as a limit to the present invention.

What is claimed is:

1. A data write method, wherein the method is applied to a storage system comprising first and second controllers configured to read data from and write data to a logical storage area, and the method comprises:
    receiving, by the second controller, a first message from the first controller in response to a snapshot operation on the logical storage area, wherein the first message indicates a first time tag stored in the second controller is expired;
    setting, by the second controller, the first time tag locally stored in the second controller to the expired state after receiving the first message;
    receiving a first data write request;
    reading, by the second controller, the first time tag from the first controller in response to the first time tag stored in the second controller being in the expired state; and
    storing, by the second controller, an association between the first time tag and the first data write request.

2. The method according to claim 1, wherein the method further comprises:
    sending, by the first controller, a second message to the second controller, wherein the second message indicates that the first controller has modified the first time tag to a second time tag;
    locally storing, by the second controller, the second time tag after receiving the second indication message;
    locally reading, by the second controller, the second time tag from the second controller after receiving a second data write request; and
    storing, by the second controller, an association between the second time tag and the second data write request.

3. The method according to claim 2, wherein before the second controller receives the second message, and after the second controller receives the first message, all time tags associated with received data write requests are from the first controller.

4. The method according to claim 1, including the second controller adding the first time tag to data carried by the first data write request; and
    writing, by the second controller and to the logical storage area, the data and the added first time tag.

5. A storage system comprising first and second controllers configured to read data from and write data to a logical storage area, wherein the second controller includes a processor and a memory storing executable instructions that, when executed by the processor, configure the second controller to:
    receive a first message from the first controller in response to a snapshot operation on the logical storage area, wherein the first message indicates a first time tag stored in the second controller is expired;
    set the first time tag locally stored in the second controller to the expired state after receiving the first message;
    receive a first data write request;
    read the first time tag from the first controller in response to the first time tag stored in the second controller being in the expired state; and
    store an association between the first time tag and the first data write request.

6. The storage system according to claim 5, wherein
    the first controller is further configured to send a second message to the second controller, wherein the second message indicates that the first controller has modified the first time tag to a second time tag;
    the second controller is further configured to locally store the second time tag after receiving the second message; and
    the second controller is further configured to (i) locally read the second time tag from the second controller, and (ii) store an association between the second time tag and the second data write request after receiving a second data write request.

7. The storage system according to claim 6, wherein before the second controller receives the second message, and after the second controller receives the first message, all time tags associated with received data write requests are from the first controller.

8. The storage system according to claim 5, wherein the processor executes the instructions to configure the second controller to add the first time tag to data carried by the first data write request and write, to the logical storage area, the data and the added first time tag.

9. A data write method applied to a storage system after a snapshot operation is performed on a logical storage area, wherein the storage system comprises first and second controllers for reading data from and writing data to the logical storage area, and the method comprises:
    determining, by the second controller, whether a locally stored first time tag is in an expired state after receiving a first data write request to write first data to the logical storage area,
        wherein the first data write request carries the first data;
    reading, by the second controller, the first time tag from the first controller in response to determining the locally stored first time tag is in the expired state;
    storing, by the second controller, an association between the first data write request and the first time tag read from the first controller;
    adding, by the second controller, to the first data the first time tag read from the first controller; and writing, by the second controller, to the logical storage area the first data and the added first time tag read from the first controller.

10. The method according to claim 9, wherein the method further comprises:
   after performing the snapshot operation on the logical storage area, sending, by the first controller, a first message to the second controller,
      wherein the first message indicates the locally stored first time tag is expired; and
   after receiving the first message, setting, by the second controller, the first time tag locally stored in the second controller to the expired state.

11. The method according to claim 10, wherein the method further comprises:
   sending, by the first controller, a second message to the second controller,
      wherein the second message indicates the first controller has modified the first time tag to a second time tag;
   after receiving the second message, locally storing, by the second controller, the second time tag; and
   after receiving a second data write request, locally reading, by the second controller, the second time tag from the second controller, and storing a correspondence between the second time tag and the second data write request.

12. The method according to claim 11, wherein before the second controller receives the second message and after the second controller receives the first message, all time tags associated with received data write requests are from the first controller.

* * * * *

UNITED STATES PATENT AND TRADEMARK OFFICE
CERTIFICATE OF CORRECTION

PATENT NO. : 11,500,741 B2
APPLICATION NO. : 17/141953
DATED : November 15, 2022
INVENTOR(S) : Wendi Weng It is certified that error appears in the above-identified patent and that said Letters Patent is hereby corrected as shown below:

In the Claims

Claim 2: Column 9, Line 60: "tag after receiving the second indication message;" should read -- tag after receiving the second message; --.

Signed and Sealed this
Eleventh Day of April, 2023

Katherine Kelly Vidal
*Director of the United States Patent and Trademark Office*